Figure 1:
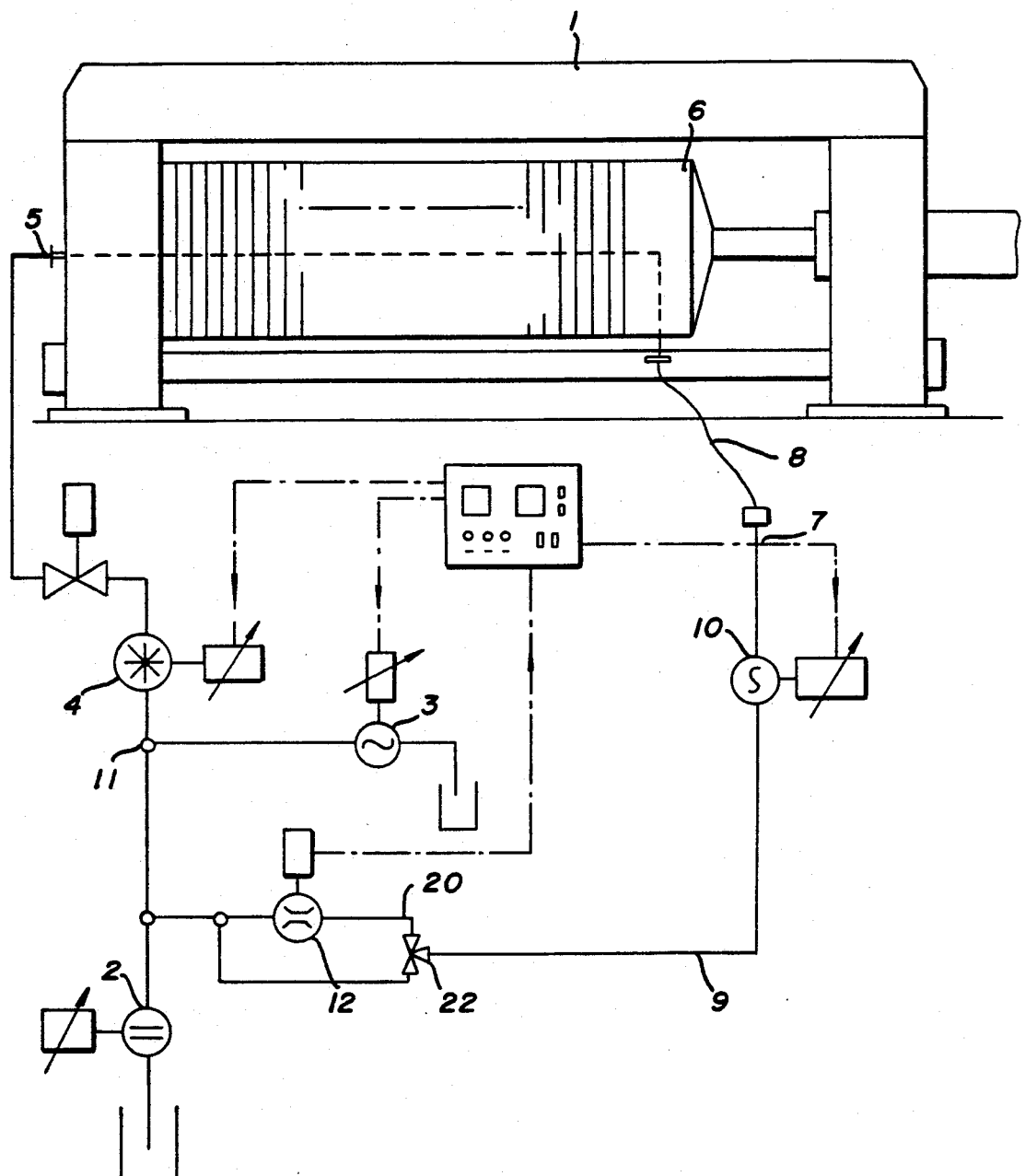

United States Patent [19]

Busse

[11] Patent Number: 5,075,012
[45] Date of Patent: Dec. 24, 1991

[54] PROCESS FOR DEWATERING SLUDGES IN FILTER PRESSES

[75] Inventor: Oswald Busse, Aarbergen, Fed. Rep. of Germany

[73] Assignee: Passavant-Werke AG, Fed. Rep. of Germany

[21] Appl. No.: 549,311

[22] Filed: Jul. 9, 1990

[30] Foreign Application Priority Data

Jul. 10, 1989 [DE] Fed. Rep. of Germany ....... 3922633

[51] Int. Cl.⁵ ............................................. C02F 11/14
[52] U.S. Cl. .................................... 210/709; 210/712; 210/714; 210/778; 210/96.1
[58] Field of Search ............... 210/609, 709, 713, 770, 210/778, 96.1, 225, 712, 714, 738

[56] References Cited

U.S. PATENT DOCUMENTS

| | | | |
|---|---|---|---|
| 3,502,210 | 3/1970 | Busse et al. | 210/137 |
| 4,354,947 | 10/1982 | Busse et al. | 210/790 |
| 4,655,932 | 4/1987 | Roslonski | 210/709 |
| 4,675,116 | 6/1987 | Hoyland | 210/709 |
| 4,861,496 | 8/1989 | Diaz | 210/713 |

FOREIGN PATENT DOCUMENTS

| | | | |
|---|---|---|---|
| 0272673 | 6/1988 | European Pat. Off. | |
| 2261158 | 9/1973 | Fed. Rep. of Germany | 210/778 |
| 2704816 | 5/1978 | Fed. Rep. of Germany | 210/96.1 |
| 3540818 | 2/1987 | Fed. Rep. of Germany | 210/770 |
| 59-6906 | 1/1984 | Japan | 210/96.1 |

*Primary Examiner*—Peter Hruskoci
*Attorney, Agent, or Firm*—Larson and Taylor

[57] ABSTRACT

To improve the dewaterability of sludge, which is dewatered in a dewatering device, in particular a plate filter press, a polymeric filter aid is added to the sludge. Since the flocs require a certain ripening time to form, a part stream of the unfiltered sludge is to be taken off according to the invention at the point opposite the feed and recycled into the main stream. The recycled flocs serve as flocculation nuclei. A further advantage of the sludge recycle is that the floc structure and/or size can then be scanned in the recycled part stream. The representative measured results are utilized for changing parameters which determine the dewaterability.

13 Claims, 3 Drawing Sheets

PROCESS FOR DEWATERING SLUDGES IN FILTER PRESSES

The invention relates to a process for conditioning and subsequent dewatering of sludges in filter presses in which a part stream of the sludge fed to the filter press is taken off at the end opposite the feed point.

Sludges from water treatment or sewage treatment are increasingly conditioned with polymeric filter aids, in order to improve their dewaterability. It is known that a readily dewaterable floc is formed only after a certain floc ripening time. In operation, especially at the start of the filtration cycle, this ripening time is not reached because of the short residence time up to the front filter plates. It is then frequently necessary to design the feed line in an appropriately large size. The object of eliminating these disadvantages is now achieved according to the invention when a part of the unfiltered sludge stream (part stream) is taken off from the dewatering device at the end opposite the feed point and this part stream is recycled to the feed. The following advantages are obtained by recycling the part stream into the sludge feed:

the recycled sludge flocs contained in the part stream act like contact sludge in the new formation of sludge flocs.

The recycled sludge flocs are comminuted by the sludge conveyor device and/or the mixing device, downstream thereof, for the polymeric filter aid in such a way that they promote new floc formation and contribute to the formation of flocs which are stable in the dewatering device.

Preferably, the recycled part stream is adjustable or controllable. As a result, the operating conditions of the dewatering device can more readily be adapted to the type of sludge and to the dewatering phase.

German Offenlegungsschrift 3,743,428, (and corresponding European Application 0 272 673) has disclosed a process for conditioning and subsequent dewatering of sewage sludges, in which the floc structure and/or size after admixture of the filter aid is scanned. The measured results are used for changing one or more of the parameters determining the dewaterability, the set values for the parameters being found by comparison with representative sludge types of optimum dewaterability. The scanning of the sludge flocs in the main stream to the dewatering device does not, however, provide the desired representative information on the behavior of the flocs in the dewatering device It is therefore proposed, in a development of the present invention, to scan not the main stream but the recycled part stream for a characteristic of the floc such as structure and/or size, before it is introduced into the main stream, and to use the measured results for altering one or more of the parameters determining the dewaterability. Such a procedure has the advantage that the flocs in the part stream which have run unfiltered through the dewatering device give better information about their dewaterability, because the influences which have acted upon them in the dewatering device are covered more thoroughly.

The sludge feed line contains a controllable mixing device downstream of the point of addition of the filter aid. This mixing device is one of the parameters which determine the filterability. In a development of the invention, it is proposed that the recycled part stream is fed in upstream of this mixing device The recycled flocs are intensively comminuted or mixed at the feed in point and made available as floc nuclei.

The scanning device can in particular be a photogrammetric probe. This scanning device operates fully satisfactorily only at a certain flow velocity. It is therefore proposed according to the invention to adapt the part stream rate during scanning to these conditions, that is to say especially to restrict it For better adaptation, it can be advantageous to place the scanning device into a by-pass of the sludge recycle line and to open this by-pass only during scanning.

Figure 2:
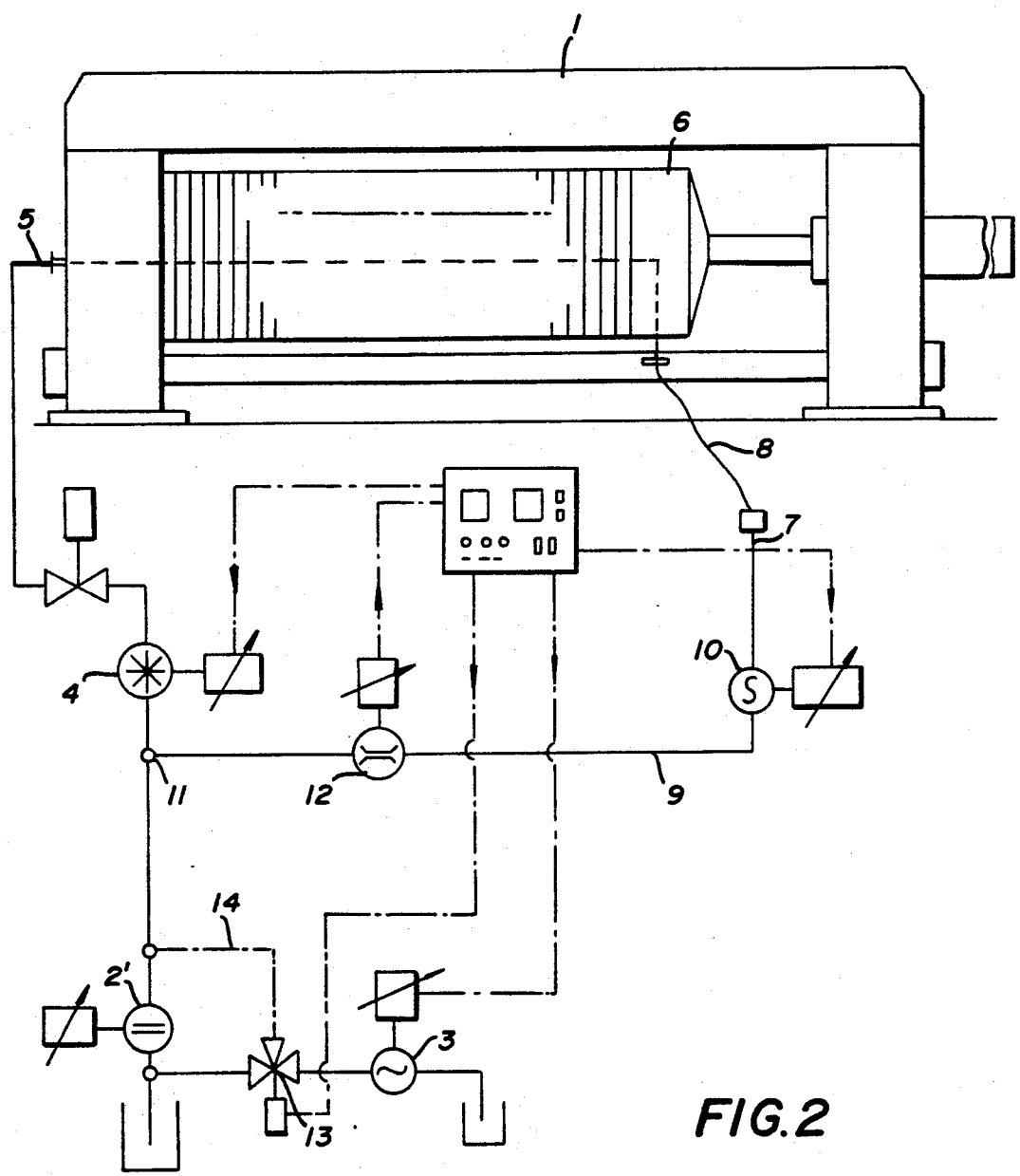
Figure 3:
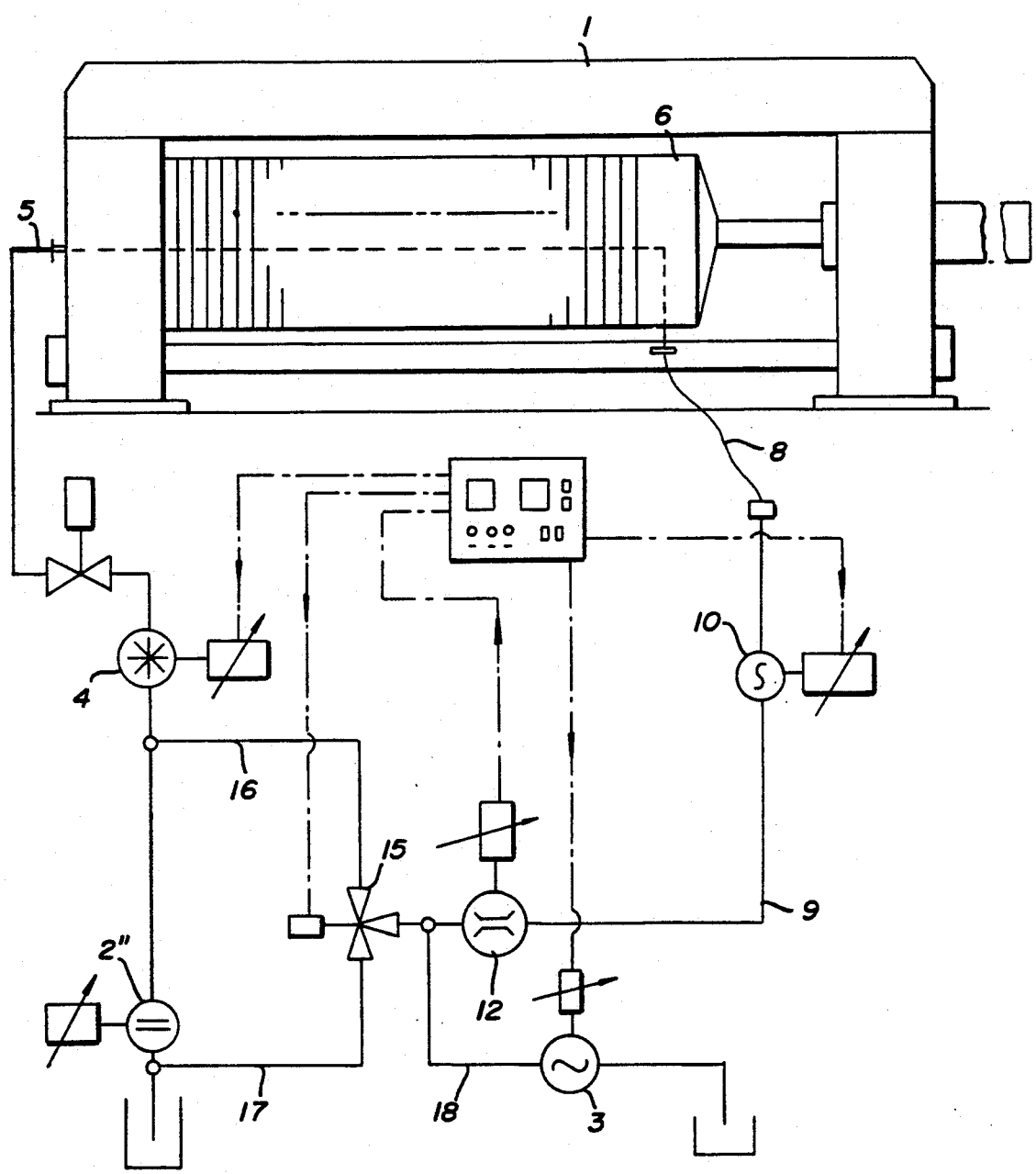

Installations suitable for carrying out the process described above are shown diagrammatically in the drawing in which FIGS. 1, 2, and 3 schematically depict different embodiments of the present invention.

The installation according to FIG. 1 consists of a plate filter press 1, a sludge delivery pump 2, a metering device 3 for the polymeric filter aid and an adjustable mixing device 4 downstream of the point of addition of the filter aid. On the side facing away from the feed 5 (that is adjacent adjustable press head 6), a take-off pipe 7 for the recycled part of the unfiltered sludge stream (part stream) is connected, the connection to the pipe laid in a fixed position being made by a flexible hose line 8. A controllable transfer pump 10 and—just before the junction 11 with the main delivery line—a photogrammetric probe 12 for scanning the recycled sludge flocs are located in the recycle line 9. The values measured by the probe are used to control the mixing device 4, the part stream transfer pump 10 and the polymer-metering device 3. If desired, probe 12 is provided in a bypass line 20 to which the part stream is directed by change-over valve 22 when scanning is required.

The installation according to FIG. 2 differs from that according to FIG. 1 only in that the junction of the filter aid addition is located on the suction side of the sludge delivery pump 2'. This arrangement has the advantage that the sludge delivery pump 2' then already serves as a comminution device for the sludge flocs formed downstream It is also conceivable to alternate the point of addition of the filter aid between the delivery side and suction side of the sludge delivery pump 2' during the filter charge or depending on the sludge type, a change-over valve 13 with a branch line 14 being provided for this purpose. The values measured by the photogrammetric probe are additionally used to control the change-over valve 13.

In the installation according to FIG. 3, the sludge recycle line 9 can in addition be connected to the suction side or delivery side of the sludge delivery pump 2". For this purpose, a change-over valve 15, controlled by the measured results and/or the filtration pressure, and corresponding branch lines 16, 17 are provided. The metering line 18 for the filter aid leads upstream of this change-over valve 15 into the recycle line 9, so that the addition of filter aid can also alternate between the delivery side and suction side.

I claim:

1. A process for conditioning and subsequent dewatering of sludges in a filter press comprising the steps of:

feeding a feed stream of sludge to a feed point of the filter press;

adding conditioning agents including polymeric filter aids to the feed stream to condition the sludge and form sludge flocs;

taking off a part of the conditioned sludge stream including sludge flocs at an end of the filter press opposite the feed point before activation of the filter press;

recycling the part of the conditioned sludge stream including sludge flocs to the feed stream;

mixing said flocs in said feed stream to form floc nuclei which permit new floc formation and contribute to the formation of flocs which are stable in the filter press; and dewatering the feed stream of sludge including floc nuclei in the filter press.

2. A process for conditioning and subsequent dewatering as claimed in claim 1 wherein the recycling step includes the step of adjusting the floc size of the part stream.

3. A process for conditioning and subsequent dewatering as claimed in claim 1 wherein the recycling step includes the step of controlling the addition of the part stream to the feed stream.

4. A process for conditioning and subsequent dewatering as claimed in claim 1 wherein the recycling step includes the step of scanning the part stream to measure a characteristic of the floc therein; and further including the step of altering a parameter which determines dewaterability based on the measured characteristic.

5. A process for conditioning and subsequent dewatering as claimed in claim 4 wherein the scanning step includes the step of adjusting a rate of flow of the part stream passing a scanning device to accommodate operating conditions of the scanning device.

6. A process for conditioning and subsequent dewatering as claimed in claim 4 wherein the scanning step includes the step of directing the part stream into a bypass line where a scanning device is located.

7. A process for conditioning and subsequent dewatering as claimed in claim 1 wherein a sludge conveyor device having a delivery side and a suction side is provided to move the feed stream of sludge into the filter press, and wherein the recycling step includes the step of introducing the part stream to the feed stream on the delivery side of the sludge conveyor device.

8. A process for conditioning and subsequent dewatering as claimed in claim 1 wherein a sludge conveyor device having a delivery side and a suction side is provided to move the feed stream of sludge into the filter press, and wherein the recycling step includes the step of introducing the part stream to the feed stream on the suction side of the sludge conveyor device.

9. A process for conditioning and subsequent dewatering as claimed in claim 1 wherein the feeding step includes the passing of the feed stream through a controllable mixing device in which the conditioning agents are mixed with the sludge; and wherein the recycling step includes the step of introducing the part stream to the feed stream upstream of the mixing device.

10. A process for conditioning and subsequent dewatering as claimed in claim 9 wherein the feeding step includes the step of adding the conditioning agents to the feed stream; and wherein the recycling step includes the introducing into the feed stream of the part stream and of the conditioning agents adjacent one another.

11. A process for conditioning and subsequent dewatering as claimed in claim 10 wherein the introducing step includes the step of adding the conditioning agents to the part stream such that the part stream and conditioning agents are added together to the feed stream.

12. A process for conditioning and subsequent dewatering as claimed in claim 10 wherein a sludge conveyor device having a delivery side and a suction side is provided to move the feed stream of sludge into the filter press and wherein the filter press operates in cycles; and wherein the recycling step includes the step of alteratingly introducing the part stream to the feed stream on the suction side and delivery side of the sludge conveyor device during the filter cycle.

13. A process for conditioning and subsequent dewatering as claimed in claim 12 wherein the recycling step further includes the steps of scanning the part stream to measure a characteristic of floc therein and alternating the introduction of the part stream between the suction side and delivery side dependent on the measured characteristic.

* * * * *